(12) United States Patent
Pennacchiotti et al.

(10) Patent No.: US 8,499,008 B2
(45) Date of Patent: Jul. 30, 2013

(54) MIXING KNOWLEDGE SOURCES WITH AUTO LEARNING FOR IMPROVED ENTITY EXTRACTION

(75) Inventors: Marco Pennacchiotti, Mountain View, CA (US); Patrick Pantel, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 685 days.

(21) Appl. No.: 12/509,310

(22) Filed: Jul. 24, 2009

(65) Prior Publication Data

US 2011/0022550 A1    Jan. 27, 2011

(51) Int. Cl.
*G06F 17/30* (2006.01)
(52) U.S. Cl.
USPC ........................................ 707/803
(58) Field of Classification Search
USPC ............... 707/694, 723, 736, 748–752, 793, 707/802, 803, 810
See application file for complete search history.

(56) References Cited

U.S. PATENT DOCUMENTS

| | | | | |
|---|---|---|---|---|
| 7,685,084 | B2 * | 3/2010 | Sisk et al. | 706/45 |
| 2007/0127824 | A1 * | 6/2007 | Luo et al. | 382/224 |
| 2008/0195596 | A1 * | 8/2008 | Sisk et al. | 707/5 |
| 2008/0243479 | A1 * | 10/2008 | Cafarella et al. | 704/9 |
| 2009/0327223 | A1 * | 12/2009 | Chakrabarti et al. | 707/3 |
| 2010/0161652 | A1 * | 6/2010 | Bellare et al. | 707/769 |
| 2010/0211588 | A1 * | 8/2010 | Jiang et al. | 707/768 |
| 2010/0223276 | A1 * | 9/2010 | Al-Shameri et al. | 707/769 |

OTHER PUBLICATIONS

Abney, Steven, "Parsing by Chunks," Berwick et al., (eds.), *Principle-Bases Parsing*, Kluwer Academic Publishers, Dordrecht. 1991.
Agichtein, E. And Gravano, L., "Snowball: Extracting relations from large plain-text collections," Proceedings of the 5th ACM International Conference on Digital Libraries, pp. 85-94, 2000.
Balcan, M. Florina and Blum, A., "A pac-style model for learning from labeled and unlabeled data," Proceedings of COLT-2005, 2005.
Blum, a. L. And Langley, P., "Selection of relevant features and examples in machine learning," Artificial Intelligence, 97:245-271, 1997.
Brill, Eric, "Transformation-based error-driven learning and natural language processing: A case study in part of speech tagging," Computational Linguistics, 21(4). 1995.
Cafarella, Michael J. et al. "KnowItNow: Fast, scalable information extraction from the web," Proceedings of EMNLP-2005. 2005.
Cao, Huanhuan et al., "Context-aware query suggestion by mining click-through and session data," Proceedings of KDD-08, pp. 875-883, 2008.
Chaudhuri, Surajit et al., "Exploiting web search to generate synonyms for entities," Proceedings of WWW-09, pp. 151-160, 2009.

(Continued)

*Primary Examiner* — Cam-Linh Nguyen
(74) *Attorney, Agent, or Firm* — Weaver Austin Villeneuve & Sampson LLP

(57) ABSTRACT

The disclosed embodiments of computer systems and techniques utilize an ensemble semantics framework to combine knowledge acquisition systems that yield significantly higher quality resources than each system in isolation. Gains in entity extraction are achieved by combining state-of-the-art distributional and pattern-based systems with a large set of features from, for example, a webcrawl, query logs, and wisdom of the crowd sources. This results in improved query interpretation and greater relevancy in providing search results and advertising, for example.

20 Claims, 6 Drawing Sheets

OTHER PUBLICATIONS

Cimiano, Philipp and Staab, Steffen, "Learning by googling," SIGKDD Explorations, 6(2):24-34, 2004.

Cimiano, Philipp and Volker, Johanna, "Towards large-scale, open-domain and ontology-based named entity classification," Proceedings of RANLP-2005, pp. 166-172, 2005.

Cimiano, Philipp et al., "Learning taxonomic relations from heterogeneous sources of evidence," Ontology Learning from Text: Methods, Evaluation and Applications, IOS Press. pp. 59-73, 2005.

Collins, M. And Singer, Y., "Unsupervised models for named entity classification," Proceedings of WVLC/EMNLP-99, pp. 100-110, 1999.

Erk, K. and Padó, S., "A structured vector space model for word meaning in context," Proceedings of EMNLP, Honolulu, HI, 2008.

Fagni, T. And Sebastiani, F., "On the selection of negative examples for hierarchical text categorization," Proceedings of LTC-07, pp. 24-28, 2007.

Fleischman, Michael and Hovy, Eduard, "Classification of named entities," Proceedings of COLING 2002, 2002.

Friedman, Jerome H., "Greedy function approximation: A gradient boosting machine," Annals of Statistics, 29(5):1189-1232, 2001.

Friedman, Jerome H., "Recent advances in predictive (machine) learning," Journal of Classification, 23(2):175-197, 2006.

Goldman, S. and Zhou, Y , "Enhancing supervised learning with unlabeled data," Proceedings of ICML-2000, 2000.

Hearst, Marti A., "Automatic acquisition of hyponyms from large text corpora," Proceedings of COLING-92, pp. 539-545, 1992.

Japkowicz, N. and Stephen, S., "The class imbalance problem: A systematic study," Intelligent Data Analysis, 6(5), 2002.

Hu, Jian et al., "Understanding user's query intent with Wikipedia," Proceedings of WWW-09, pp. 471-480, 2009.

Kubat, M. And Matwin, S., "Addressing the curse of imbalanced data sets: One-side sampling," Proceedings of the ICML-1997, pp. 179-186. Morgan Kaufmann, 1997.

Laender, A. H. F. et al., "A brief survey of web data extraction tools," SIGMOD Rec., 31(2):84-93, Jun. 2002.

Lin, Dekang, "Automatic retrieval and clustering of similar words," Proceedings of COLING-ACL-98, 1998.

Mc Carthy, Joseph F. and Lehnert, Wendy G., "Using decision trees for coreference resolution," Proceedings of IJCAI-1995, pp. 1050-1055, 2005.

Mirkin, Shachar et al., "Integrating pattern-based and distributional similarity methods for lexical entailment acquisition," Proceedings of ACL/COLING-06, pp. 579-586, 2006.

Paşca, Marius and Van Durme, Benjamin, "Weakly-supervised acquisition of open-domain classes and class attributes from web documents and query logs," Proceedings of ACL-08, pp. 19-27, 2008.

Paşca, Marius et al., "Organizing and searching the world wide web of facts—step one: The one-million fact extraction challenge," Proceedings of AAAI-06, pp. 1400-1405, 2006.

Pantel, Patrick and Pennacchiotti, Marco, "Espresso: A Bootstrapping Algorithm for Automatically Harvesting Semantic Relations," Proceedings of ACL-2006, 2006.

Pantel, P. And Lin, D., "Discovering word senses from text," Proceedings of KDD-02, pp. 613-619, 2002.

Pantel, P. et al., "Web-scale distributional similarity and entity set expansion," Proceedings of EMNLP-09, 2009.

Rebbapragada, U. and Brodley, C. E., "Class noise mitigation through instance weighting," Proceedings of the 18th European Conference on Machine Learning, 2007.

Riloff, Ellen and Jones, Rosie, "Learning dictionaries for information extraction by multi-level bootstrapping," Proceedings of AAAI-99, pp. 474-479, 1999.

Sarkar, A., "Applying co-training methods to statistical parsing," NAACL-2001, 2001.

Talukdar, Partha Pratim et al., "Weakly-supervised acquisition of labeled class instances using graph random walks," Proceedings of EMNLP-08, pp. 582-590, 2008.

Tan, Bin and Peng, Fuchun. "Unsupervised query segmentation using generative language models and Wikipedia," Proceedings of WWW-06, pp. 1400-1405, 2006.

Taney, Hristo and Magnini, Bernardo, "Weakly supervised approaches for ontology population," Proceedings of EACL-2006, 2006.

Wiener, E. D. et al., "A neural network approach to topic spotting," SDAIR-95, 1995.

Yan, Y. et al., "Unsupervised relation extraction by mining Wikipedia texts with support from web corpus," Proceedings of ACL-09, 2009.

Yangarber, R. et al., "Unsupervised learning of generalized names," COLING-2002, 2002.

Yarowsky, D., "Unsupervised word sense disambiguation rivaling supervised methods," Proceedings of ACL-1995, pp. 189-196, 1995.

Yarowsky, D., "Combining labeled and unlabeled data with co-training," Proceedings of the Workshop on Computational Learning Theory, pp. 92-100, 1998.

\* cited by examiner

MIXING KNOWLEDGE SOURCES WITH AUTO LEARNING FOR IMPROVED ENTITY EXTRACTION

BACKGROUND OF THE INVENTION

This invention relates generally to search systems and more particularly to the processing and assessment of information evaluated and presented by the search systems.

Search engines such as Yahoo, Live, and Google collect large sets of entities to better interpret queries, to improve query suggestions, and to understand query intents.

SUMMARY OF THE INVENTION

The disclosed embodiments greatly improve ranking and selection of entities, which results in better query interpretation and thus provides for greater relevancy in search results and better targeted advertising, for example. Noisy sources are combined with generated features for improved entity extraction.

In one embodiment the features are extracted from a webcrawl, query logs and wisdom of the crowd sources with a range of feature extractors. The instances are generated from multiple sources and source types of knowledge (e.g. structured, semi-structured, and unstructured sources such as web documents). This is done with various different extractors and types of extractors (e.g. wrappers, distributional extractors, pattern learning systems etc.) and feature generators. Large gains in mean average precision are observed when compared with knowledge extractors taken in isolation.

The computer system is configured to: extract instances from a plurality of sources using a plurality of knowledge extractors; aggregate the instances; extract a feature vector for an instance using a plurality of feature generators. One of the feature generators of the plurality extracts contexts of a query log for a plurality of seeds, and calculates an association statistic between the contexts and seeds. The computer system sorts the contexts by the calculated association statistics and selects a group of the sorted contexts. For each context, the system generates a feature for a candidate instance comprising the association statistic between the candidate instance and the context. The system then automatically builds labeled training sets from extracted feature vectors and one or more sources of negative instances.

A decoder based upon the automatically built and learnt training sets may then be used either to label or rank instances.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention. All papers referenced herein are hereby incorporated by reference in the entirety.

Distributional and pattern-based extraction algorithms capture aspects of paradigmatic and syntagmatic dimensions of semantics, respectively.

Although distributional and pattern-based algorithms are complementary, they do not exhaust the semantic space; other sources of evidence can be leveraged to better combine them. Embodiments leverage additional sources of evidence to better combine the distributional and pattern based techniques. This enables improved fulfillment of search queries and better targeted advertisements, among other advantages.

Figure 1:
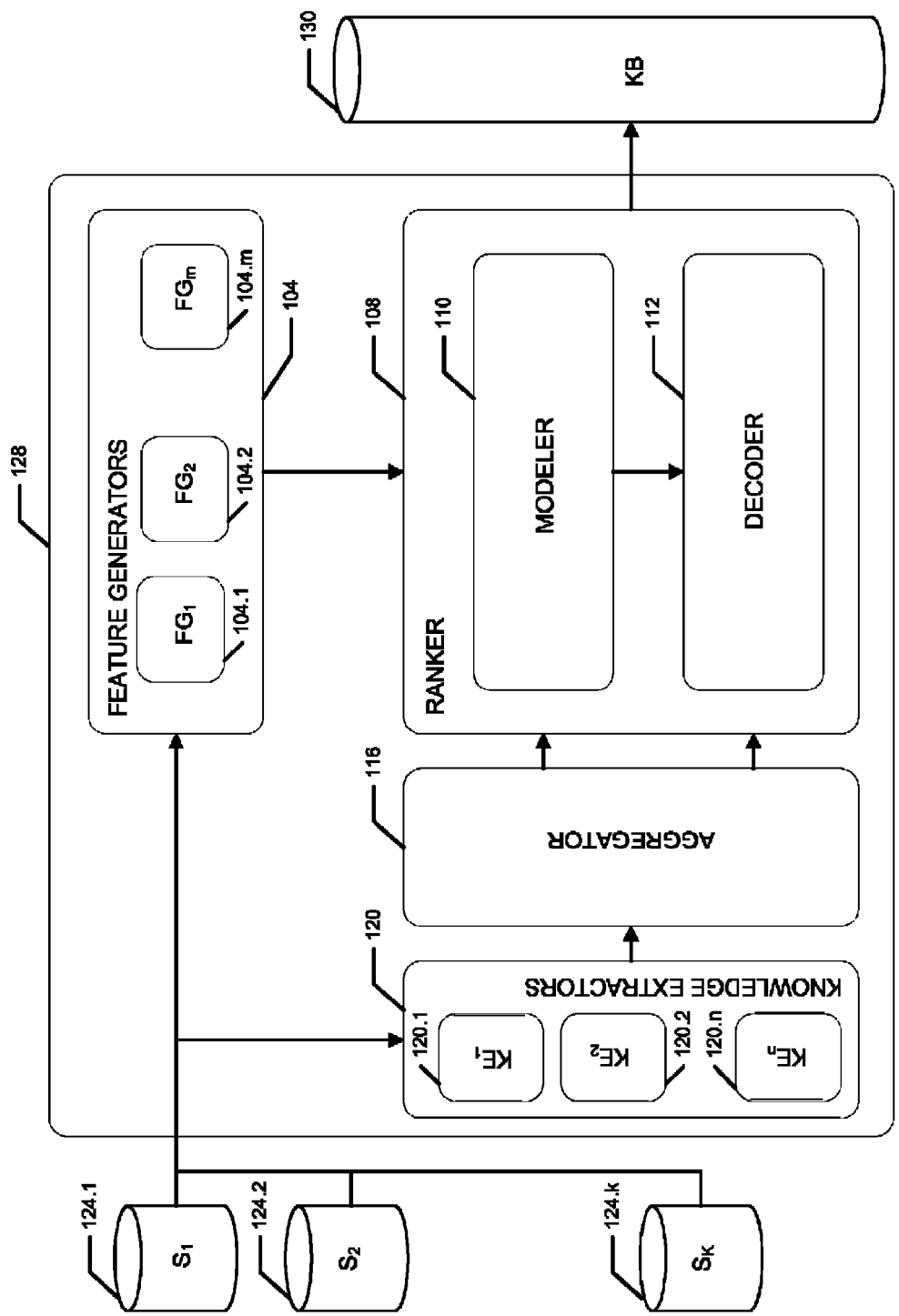
FIG. 1 illustrates a block diagram of an ensemble semantics framework according to an embodiment of the invention.

Computer systems and computer implemented methods therein are configured to mix knowledge sources and features in a framework called Ensemble Semantics ("ES"). An embodiment of the ES framework is shown in FIG. 1

Computer systems that implement such a framework achieve large and significant gains over computer systems using available extractors. Experimental results on a webscale extraction of actors, athletes and musicians show significantly higher mean average precision scores (29% gain) compared with prior techniques and systems.

Ensemble Semantics is a general framework for modeling knowledge acquisition algorithms that combine multiple sources of information. The ES framework configures computer system to:

Represent multiple sources of knowledge and multiple extractors of that knowledge;
Represent multiple sources of features;
Integrate both rule-based and ML-based knowledge ranking algorithms; and
Model knowledge acquisition systems.

A computer system configured with the ES framework can be instantiated to extract various types of knowledge such as entities, facts, and lexical entailment rules, as will be described below. It can also be configured to build a model and utilize the model to decode instances. These may be used to fulfill search requests and provide relevant advertising etc., as mentioned above.

Sources ("S") 124.1, 124.2 . . . 124.k are textual repositories of information. For example, the sources may be structured (e.g., a database such as DbPedia), semi-structured (e.g., Wikipedia Infoboxes or HTML tables) or unstructured (e.g., news articles or a webcrawl).

Knowledge Extractors ("KEs") 120 are responsible for extracting candidate instances such as entities or facts. Examples of techniques for knowledge extraction include fact extraction systems such as those described in *KnowIt-Now: Fast, scalable information extraction from the web* by Michael J. Cafarella, Doug Downey, Stephen Soderland, and Oren Etzioni. 2005, *In Proceedings of EMNLP*-2005, and entity extraction systems such as those described in *Weakly-supervised discovery of named entities using web search queries* by Marius Pasca. 2007, *In Proceedings of CIKM-*07,

*pages 683-690, New York, N.Y., USA*, which are hereby incorporated by reference in the entirety, as are all documents referred to in this application.

Preferred embodiments of the computer system and techniques utilize two different types of knowledge extractors: one pattern-based and the other distributional. For example, $KE_1$ could be patterned based while $KE_2$ is distributional. In some embodiments, additional types of extractors may be utilized, for example, $KE_n$ could be yet another type of extractor rather than simply another instance of a pattern-based or distributional extractor. Pattern-based extractor ("$KE_{pat}$"): Given seed instances or examples of a binary relation, the pattern based extractor finds instances of that relation. The pattern-based approach leverages lexicosyntactic patterns to extract instances of a given class. The extractor extracts entities of a class, such as Actors, by instantiating typical relations involving that class such as act-in (Actor, Movie). The system utilizes such relations instead of the classical is-a patterns since these have been shown to bring in too many false positives. The extractor's confidence score for each instance is used by the ranker 108 to score the entities being extracted, among other features.

Distributional extractor ("$KE_{dis}$"): Embodiments implement a variant of a distributional entity extractor. One example of such an extractor is described in *Weakly supervised approaches for ontology population by Hristo Tanev and Bernardo Magnini, In Proceedings of EACL*-2006, which is hereby incorporated by reference in the entirety. For each noun in a source corpus, the system builds a context vector comprising the noun chunks preceding and following the target noun, scored using pointwise mutual information (pmi).

Given a small set of seed entities S of a class, the extractor computes the centroid of the seeds' context vectors as a geometric mean, arithmetic average, or weighted arithmetic average, and then returns all nouns whose similarity with the centroid exceeds a threshold τ (using the cosine measure between the context vectors).

Pasca et al., 2006 cited above,) or machine learning based (e.g., the SVM model described in *Integrating pattern-based and distributional similarity methods for lexical entailment acquisition; Shachar Mirkin, Ido Dagan, and Maayan Geffet.* 2006; *In Proceedings of ACL/COLING-06*, pages 579-586 for combining pattern-based and distributional features).

In a preferred embodiment, the ranker 108 utilizes a supervised machine learning regression model. Preferably, a gradient boosted decision tree ("GBDT") regression model. The modeler 110 builds a model (logic forming a training set) comprising an ensemble of decision trees, fitted in a forward step-wise manner to current residuals. The decoder 112 then applies the model to rank the instances. For further information on the GBDT algorithm, please refer to *Greedy function approximation: A gradient boosting machine by Jerome H. Friedman*. 2001; *Annals of Statistics*, 29(5):1189-1232 hereby incorporated by reference in the entirety. By drastically easing the problem of overfitting on training data (which is common in boosting algorithms), ranker 108 utilizing a GDBT modeler 110 competes with state-of-the-art machine learning techniques, such as support vector machines, with much smaller resulting models and faster decoding time. The ranker's model is trained on either a manually annotated random sample of entities taken from aggregator 116, using the features generated by the feature generators 104.1-104.m, or automatically trained. The decoder 112 then ranks each entity according to the trained model of modeler 110, as will be discussed in greater detail with regard to the flow chart of FIG. 2.

Information sources 124 serve as inputs to the system. Some sources will serve as sources for KEs 120 to generate candidate instances, some will serve as sources for FGs 104 to generate features or evidence of knowledge, and some will serve as both. The Ranker collects the candidate instances assembled by the aggregator 116, and ranks them using the evidence provided by the feature generators ("FGs") 104. In one embodiment, aggregator 116 unions the candidate

TABLE 1

Feature space describing each candidate instance (S indicates the set of seeds for a given class)

| Family | Type | | Features[1] |
|---|---|---|---|
| Web (w) | Frequency | (wF) | term frequency; document frequency; term frequency as noun phrase |
| | Pattern | (wP) | confidence score returned by $KE_{pat}$; pmi with the 100 most reliable patterns used by $KE_{pat}$ |
| | Distributional | (wD) | distributional similarities with each seed in S |
| | Termness | (wT) | ratio between term frequency as noun phrase and term frequency; pmi between internal tokens of the instance; capitalization ratio |
| Query Log (q) | Frequency | (qF) | number of queries matching the instance; number of queries containing the instance |
| | Co-occurrence | (qC) | query log pmi with any seed in S |
| | Pattern | (qP) | pmi with a set of trigger words T (i.e., the 10 words in the query logs with highest pmi with S) |
| | Distributional | (qD) | distributional similarity with S (vector coordinates consist of the instance's pmi with the words in T) |
| | Termness | (qT) | ratio between the two frequency features F |
| Web table (t) | Frequency | (tF) | table frequency |
| | Co-occurrence | (tC) | table pmi with S; table pmi with any seed in S |
| Wisdom of the crowd e.g. Wikipedia (k) | Frequency | (kF) | term frequency |
| | Co-occurrence | (kC) | pmi with any seed in S |
| | Distributional | (kD) | distributional similarity with S |

Ranker ("R") 108 ranks the knowledge instances returned from KEs 120 using the features generated by FGs 104. Ranking techniques and/or algorithms may be rule-based (e.g., one using a threshold on distributional similarity in instances, while in another embodiment aggregator 116 intersects the candidate instances across sources.

Embodiments comprise a plurality of feature generators 104. Feature generators 104 e.g. 104.1, 104.2 . . . 104.m extract evidence (features) of knowledge which is used to decide which candidate instances extracted from KEs are deemed correct by the ranker 108. Examples include capitalization features for named entity extractors, and the distributional similarity matrix described in *Organizing and searching the world wide web of facts—step one: The one-million fact extraction challenge by Marius Pasca, Dekang Lin, Jeffrey Bigham, Andrei Lifchits, and Alpa Jain.* 2006, *In Proceedings of AAAI-06,* pages 1400-1405, for filtering facts. Results of the ES framework 128 may be stored in knowledge base 130.

One implementation comprises four feature generators, which compute a total of, for example, several hundred features. An exemplary set of features is described in Table 1. Each generator extracts from a specific source a feature family, as follows.

Web (w): a body of documents (e.g. 600 million) crawled from the Web in 2008;

Query logs (q): one year or other time period of web search queries;

Web tables: all HTML inner tables extracted from the above Web source; and

Wisdom of the Crowd: collective information from a wisdom of the crowd site, e.g. Wikipedia. The information may be taken as an authorized dump on a given date, for example a dump in February, 2008 consisted of about 2 million articles.

As seen in Table 1 above, feature families are further subclassified into five types: frequency (F) (frequency-based features); co-occurrence (C) (features capturing first order co-occurrences between an instance and class seeds); distributional (D) (features based on the distributional similarity between an instance and class seeds); pattern (P) (features indicating class-specific lexical pattern matches); termness (T) (features used to distinguish well-formed terms such as 'Brad Pitt' from ill-formed ones such as 'with Brad Pitt'). The seeds S used in many of the feature families are the same seeds used by the $KE_{pat}$ extractor.

The different seed families are designed to capture different semantic aspects:

paradigmatic (D), syntagmatic (C and P), popularity (F), and term cohesiveness (T).

Figure 2:
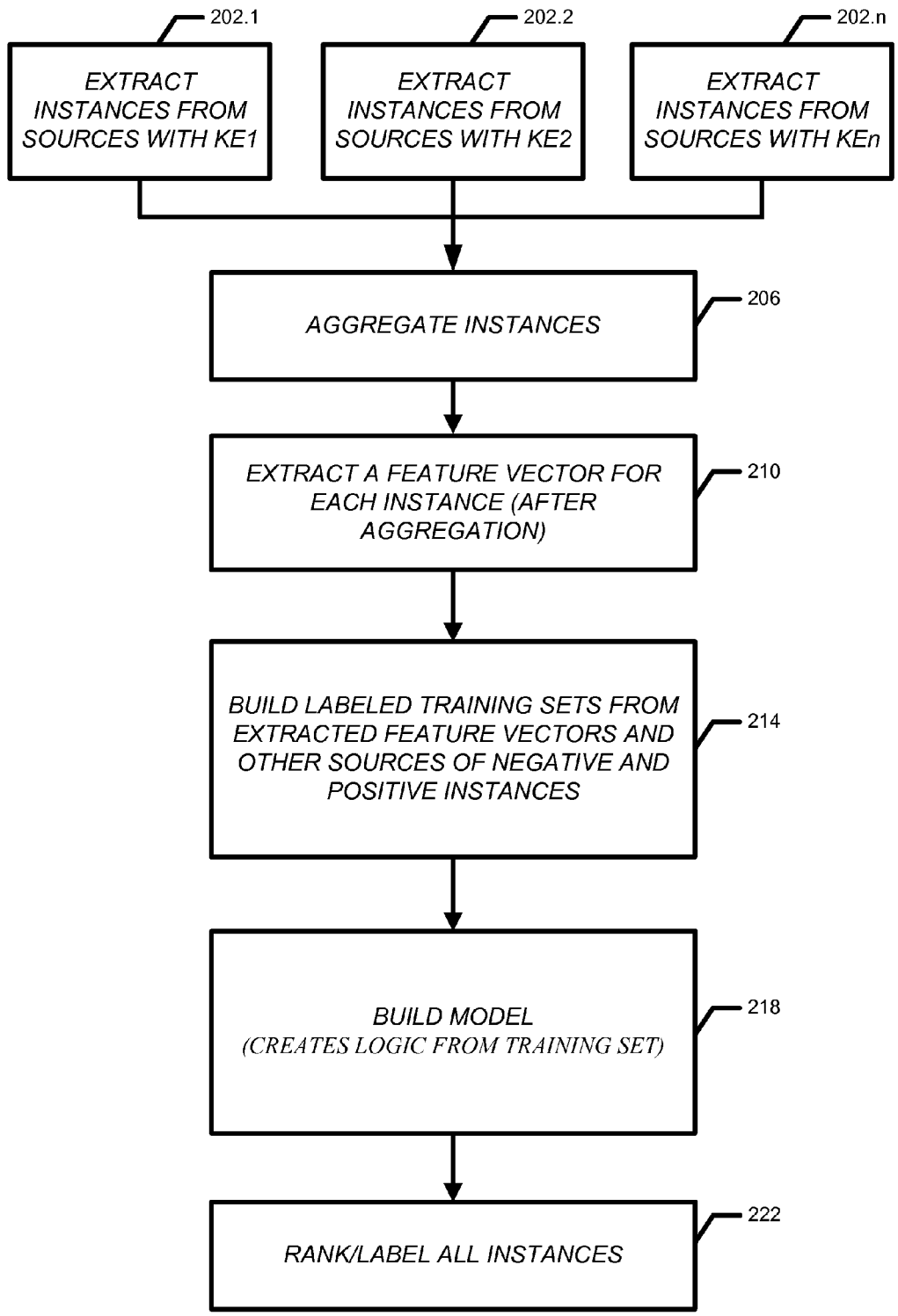
FIG. 2 illustrates a flow chart of an entity extraction process with the system depicted in FIG. 1.

Referring to FIG. 2, in steps 202.1 to step 202.n, extractors KE 120.1 to 120.n extract instances from various sources 124.1 to 124.k. Then, in step 206, aggregator 116 aggregates the instances to produce all of the candidate instances. In step 210, the feature generators, alone or in combination, extract a feature vector for each instance. Note that the feature generators may use as input any of sources 124 and the information extracted by extractors 120.

Of particular note are the following feature generators, which will be described in FIGS. 3A-3C.

| | | |
|---|---|---|
| 1. Query log (q) Pattern | (qP) | pmi with a set of trigger words T (i.e., the 10 words in the query logs with highest pmi with S) |
| 2. Query log (q) Distributional | (qD) | distributional similarity with S (vector coordinates consist of the instance's pmi with the words in T) |
| 3. Web Table (t) Co-occurrence | (tC) | table pmi with S; table pmi with any seed in S |

Figure 3A:
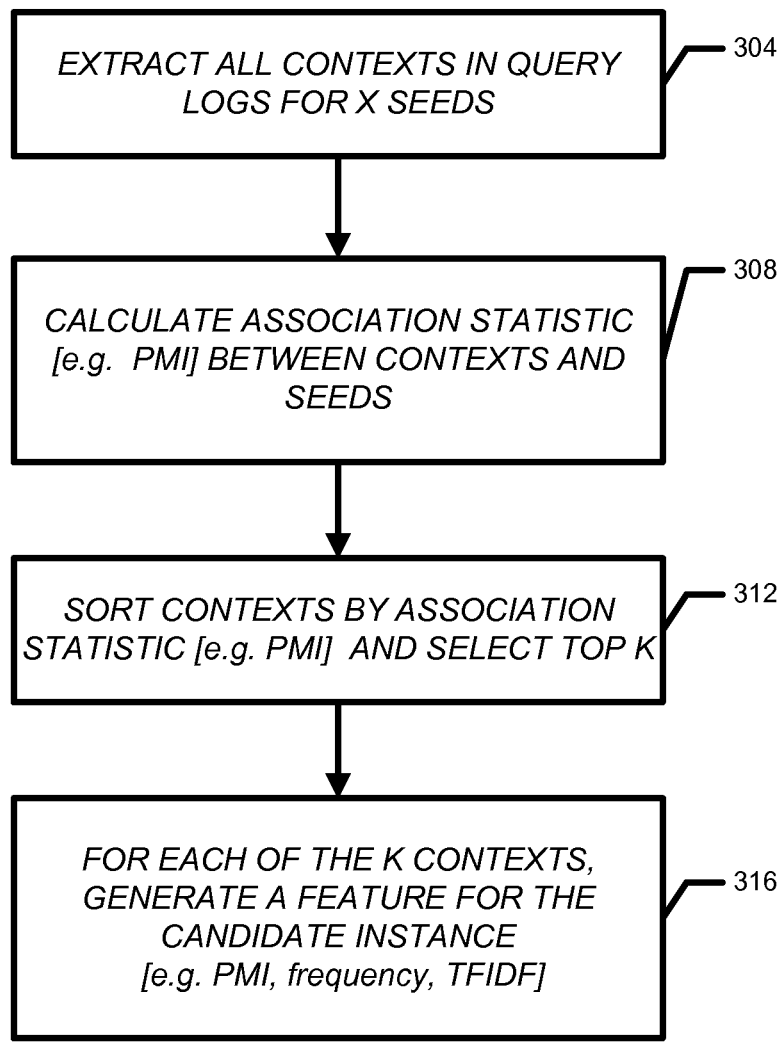
FIG. 3A illustrates pattern feature generation.

FIG. 3A illustrates pattern feature generation.

In step 304, the system will extract all contexts in a query log for x seeds. In step 308 the system will calculate an association statistic between contexts and seeds. In a preferred embodiment, this is achieved by calculating the pointwise mutual information ("PMI") value between the contexts and seeds. In step 312, the system sorts the contexts by the association statistic (e.g. PMI) and selects from among the sorted contexts. For example, the system selects the top K contexts. In step 316, for each of the K contexts the system will generate a feature for the candidate instance, which is, for example the PMI, frequency or TFIDF between the candidate instance and the context. The K contexts are referred to as the trigger words in the above tables.

Figure 3B:
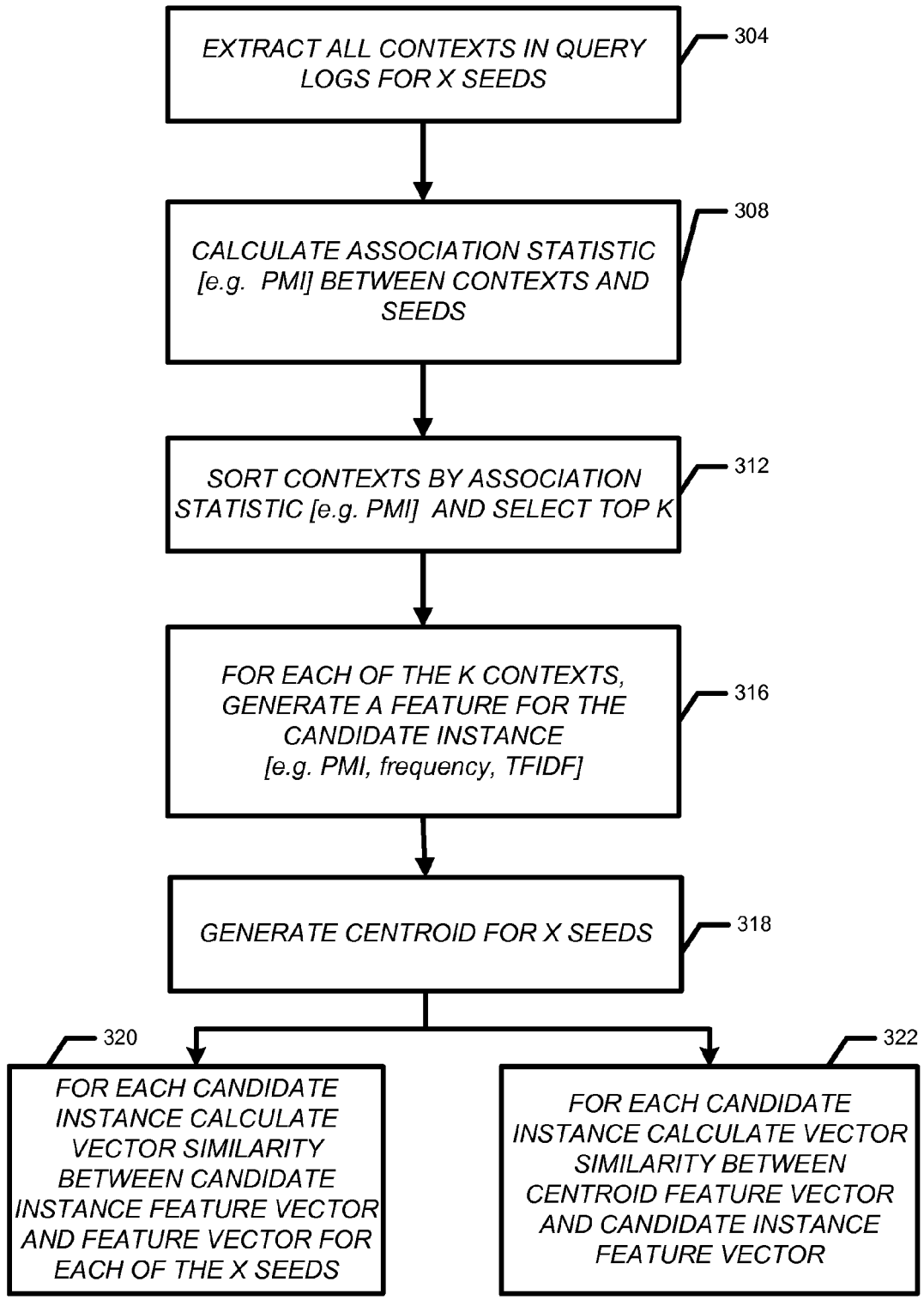
FIG. 3B illustrates distributional/similarity feature generation.

FIG. 3B illustrates distributional or similarity feature generation. Steps 304 to 316 are as described above with regard to FIG. 3A. In step 318, the system will generate a centroid for the X seeds. The centroid is generated as a combination of the feature vectors of the X seeds. In various embodiments this is calculated, for example as a geometric average, arithmetic average, or weighted arithmetic average of the feature vectors. In step 320, the system will calculate the distributional similarity between a candidate instance and each of the seeds S for a given class. This is calculated based on the cosine between the feature vector of the candidate instance, and the vector of each seed, or may alternatively be based on a dice calculation. The resultant features are represented by the obtained similarities value between candidate and seeds S. In step 322, for each candidate instance the system will calculate vector similarity between the centroid feature vector and candidate instance feature vector.

Figure 3C:
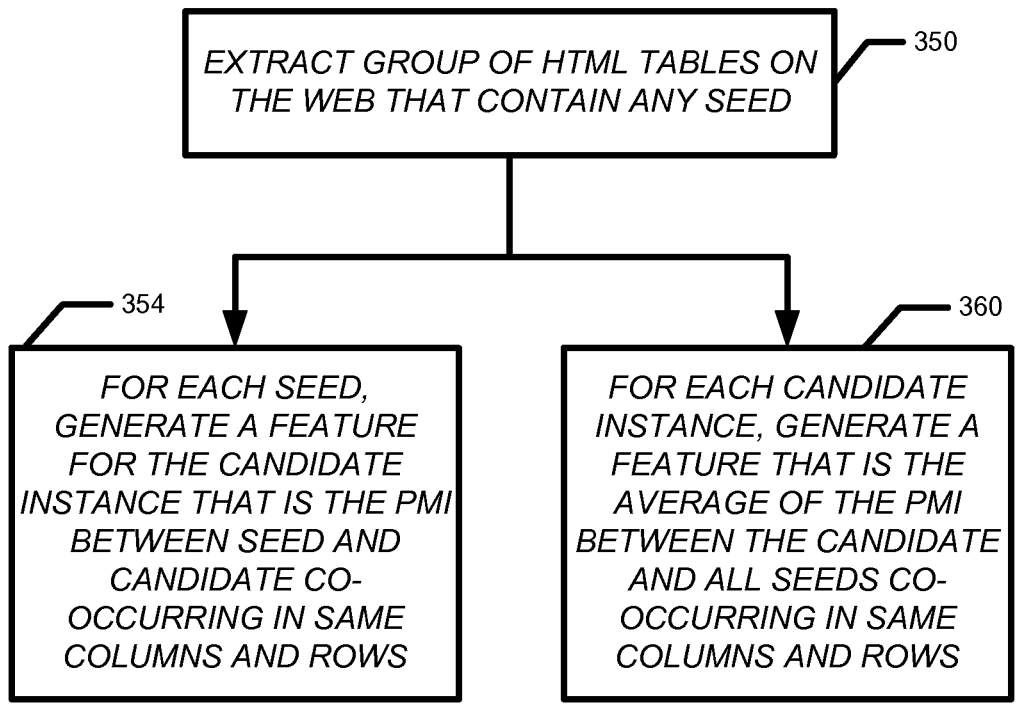
FIG. 3C illustrates co-occurrence feature generation.

FIG. 3C illustrates co-occurrence feature generation. In step 350, the system will extract a group of HTML tables from the web that contain any seed of the X seeds. In step 354, for each seed the system will generate a feature for the candidate instance that is the PMI between the seed and the candidate instance co-occurring the same columns and rows of web tables. In step 360, for each candidate instance the system will generate a feature that is the average of the PMI between the candidate instance and all seeds co-occurring the same columns and rows of a web table.

Other features/feature vectors that may be utilized or computed can be seen in Table 1 above.

Referring again to FIG. 2, in step 214, the system will build labeled training sets from the extracted feature vectors. In certain embodiments, the training set is also built based upon sources of negative instances and sources of positive instances (in contrast to extracted instances). As mentioned above, the ranker's model is trained on either a manually annotated random sample of entities taken from Aggregator 116, or automatically trained (auto learning) using the features generated by the feature generators. In step 218, the system will build the model, from the training by using the modeler 110. In step 222, the system will label all instances by using the decoder 112. In other words, the decoder 112 ranks each entity according to the trained model. The rank may be on a scale of, for example, 1-10, or may be discrete positive/negative or include/exclude decision. Step 222 results in a set of chosen instances. As mentioned, the modeler preferably adopts a supervised machine learning regression model, such as a gradient boosted decision tree model, although other models may be utilized.

Auto-Learning in Ensemble Semantics

An embodiment of a computer system configured with the ensemble semantics framework automatically builds a labeled training set or model 112.

In order to have good decoding performance (either classification or regression), training data should be: (1) balanced and large enough to correctly model the problem at hand; (2) representative of the unlabeled data to decode, i.e., training and unlabeled instances should be ideally drawn from the same distribution. If these two properties are not met, various learning problems, such as overfitting, can drastically impair predictive accuracy.

While some embodiments utilize a subset of the unlabeled data (i.e., the instances to be decoded), and manually label them to build the training set, in one embodiment this is automatically done, as discussed below.

Automatic Extraction of Positive and Negative Examples

Given a target class c, T(c) denotes its training data, and respectively P(c) and N(c) the positive and negative subsets of the training. Unlabeled data is denoted as U(c), the set of instances collected by the aggregator that must be decoded by the ranker's learning algorithm.

For example, in entity extraction, given the class Actors, we could have P(c)={Brad Pitt; Robert De Niro} and N(c) ={Serena Williams; Rome; Robert Demiro}.

Acquiring Positive Examples

Trusted positives: The simplest approach to acquire a set of positive examples, P(c), is to define a positive example as one in U(c) that has been extracted by a trusted KE. More formally:

$$P(c)=\{i \epsilon U(c): \exists KEi | KEi \text{ is trusted}\} \quad (1)$$

where KEi is a knowledge extractor that extracted instance i.

However, instances in P(c) are not necessarily extracted also by untrusted KEs. Since the goal of the Ranker is to rank examples from untrusted KEs, many of the examples in P(c) could not be representative of the population extracted by the untrusted KEs. This can highly impact the performance of the learning algorithm, which could overfit the training data on properties that are not representative of the true population to be decoded.

To minimize this problem, the system enforces that the instances in P(c) are extracted not only from a trusted KE, but also from any of the untrusted KE's:

$$S(c)=\{i \epsilon U(c): \exists KEi | KEi \text{ is trusted} \wedge \exists KEi | KEi \text{ is untrusted}\} \quad (2)$$

The above constraint ensures that instances in P(c) are drawn from the same distribution as U(c).

External Positives: External positives are a set of positive examples P(c) from an external repository, e.g. an ontology, a database, or an automatically harvested source.

Use of external positive examples is advantageous because such resources are widely available for many knowledge extraction tasks.

Acquiring Negative Examples

Acquiring negative training examples is not as easy as acquiring positive ones. The main challenge is to select a set that is a good representative of the unlabeled negatives in U(c). Embodiments utilize the following types of negatives.

Near-class negatives: Near class negatives N(c) are selected from the population U(C) of the set of classes C which are semantically similar to c. For example, in entity extraction, the classes Athletes, Directors and Musicians are semantically similar to the class Actors, while Manufacturers and Products are dissimilar. Similar classes may be used to select negative examples which are semantic near-misses for the class c: a positive instance extracted for a class similar to the target class c, is likely to be a near-miss incorrect instance for c.

N(c) in one embodiment is preferably selected from the set of instances that have the following two qualities:

1. The instance is most likely correct for C; and
2. The instance is most likely incorrect for c Note that quality (1) alone is not always sufficient, as an instance of C can be at the same time also instance of c. For example, given the target class Actors, the instance 'Woody Allen' ∈Directors, is not a good negative example for Actors, since Woody Allen is both a director and an actor.

In order to rely upon quality (1), the system preferably selects only instances that have been extracted by a trusted KE of C, i.e. the confidence of them being positive is very high. To enforce (2), the system selects instances that have never been extracted by any KE of c. More formally, we define N(c) as follows:

$$N(c) = \bigcup_{c_i \in C} P(c_i) \setminus U(c) \quad (3)$$

The main advantage of this method is that it acquires negatives that are semantic near-misses of the target class, thus allowing the learning algorithm to focus on these borderline cases. This is an advantageous property, as most incorrect instances extracted by unsupervised KEs are indeed semantic near-misses.

Generic negatives: In certain embodiment, the system may also select N(c) from the population U(C) of all classes C different from the target class c, i.e., both classes semantically similar and dissimilar to c. The method is very similar to the one above, apart from the selection of C, which now includes any class different from c. In this case, a positive instance extracted for a class different from the target class c, is likely to be an incorrect instance for c.

This technique acquires negatives that are both semantic near-misses and far-misses of the target class. The ranker is then able to focus both on borderline cases and on clear-cut incorrect cases, i.e. the space is potentially larger than for the near-class method, since there is more variety in N(c).

Same class negatives: If a candidate instance for a class c has been extracted by only one KE and this KE is untrusted, then the instance is likely to be incorrect, i.e., a negative example for c, and is considered a generic negative.

Accordingly N(c) may be defined as follows:

$$N(c)=\{i \epsilon U(c): \exists ! KEi \wedge KEi \text{ is untrusted}\} \quad (4)$$

The main advantage of this method is that the acquired instances in N(c) are good representatives of the negatives that will have to be decoded, i.e., they are drawn from the same distribution U(c). This allows the learning algorithm to focus on the typical properties of the incorrect examples extracted by the pool of KEs.

In the auto learning embodiment, the positive and negative components of the training set for the system in general, and the ranker 108 in particular, are built using the auto-learning methods presented above, as follows:

Trusted positives ($P_{trs}$ and $P_{cls}$): According to Eq. 2, the system acquires a set of positive instances $P_{cls}$ as a random sample of the instances extracted by both $KE_{trs}$ and either: $KE_{dis}$ $KE_{pat}$ or both of them. The system may alternatively utilize the simpler definition in Eq. 1, i.e. acquire a set of positive instances $P_{trs}$ as a random sample of the instances extracted by the trusted extractor $KE_{trs}$, irrespective of if they are also extracted by $KE_{dis}$ and $KE_{pat}$.

External positives ($P_{cbc}$): Any external repository of positive examples serves as a source of external positives.

Same-class negatives ($N_{cls}$): A set of negative instances are acquired as a random sample of the instances extracted by only one extractor, which can be either of the two untrusted ones, $KE_{dis}$ or $KE_{pat}$.

Near-class negatives ($N_{oth}$): The system selects a set of negative instances, as a random sample of the instances extracted by any of the three extractors $KE_{trs}$ $KE_{dis}$ or $KE_{pat}$ for a class different than the one at hand. The system may also set a condition that instances in $N_{oth}$ must have not been extracted by the class at hand.

Generic negatives ($N_{cbc}$): As an exhaustive repository of instances for all possible taxonomical classes is not available, the system relies upon a repository of generic negatives automatically extracted by an external system, and clustered in semantically coherent clusters. The system will select as generic negatives a random sample of instances appearing any of the cluster of the repository. To ensure that no instances of the class at hand are selected, clusters containing at least one member of the class are discarded before the selection.

The above described classes and instances may also be manually generated in certain embodiments, rather than auto learned.

Figure 4:
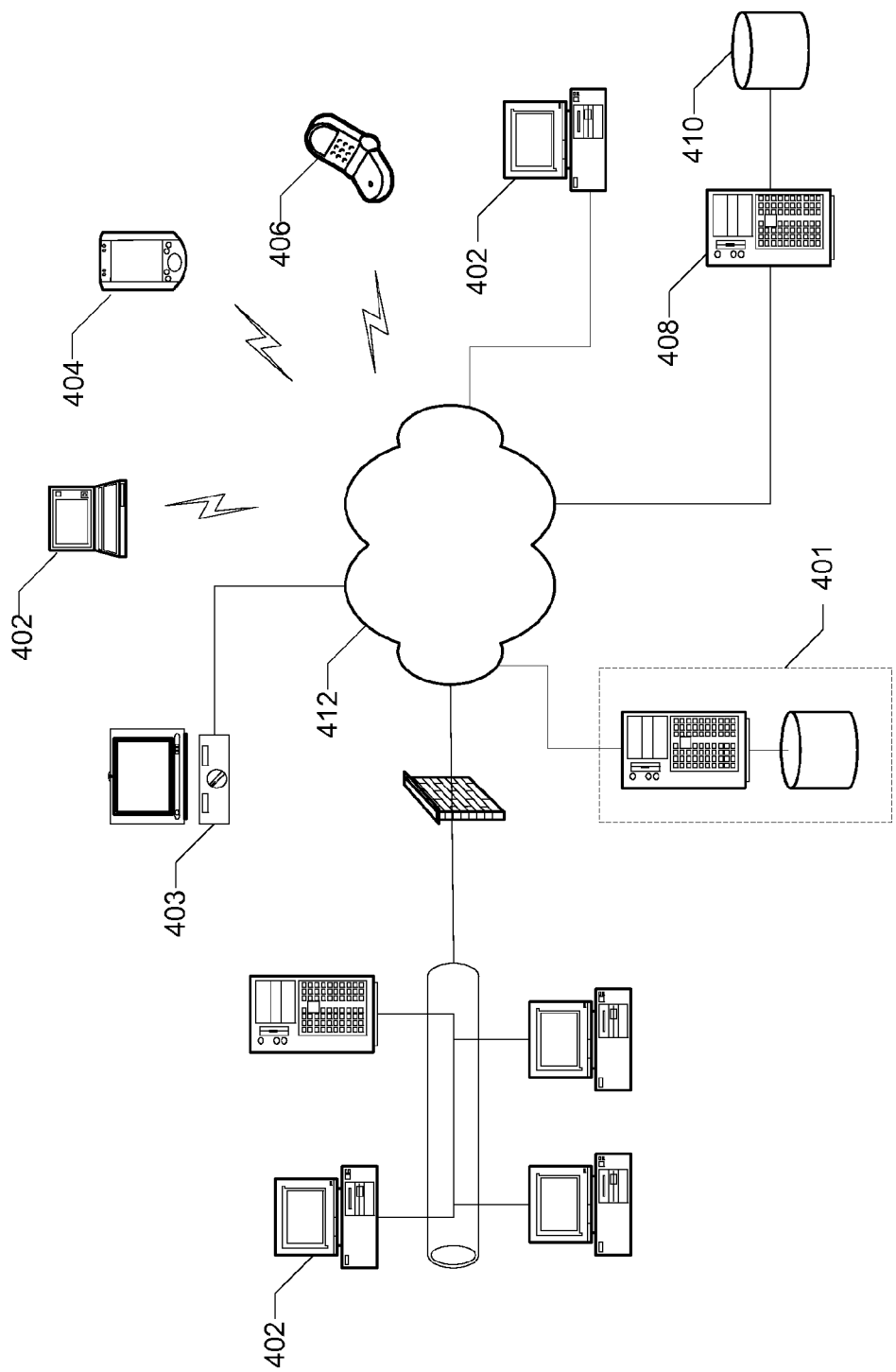
FIG. 4 is a simplified diagram of a computing environment in which embodiments of the invention may be implemented.

The above techniques are implemented in a search provider computer system. Such a search engine or provide system may be implemented as part of a larger network, for example, as illustrated in the diagram of FIG. 4. Implementations are contemplated in which a population of users interacts with a diverse network environment, accesses email and uses search services, via any type of computer (e.g., desktop, laptop, tablet, etc.) 402, media computing platforms 403 (e.g., cable and satellite set top boxes and digital video recorders), mobile computing devices (e.g., PDAs) 404, cell phones 406, or any other type of computing or communication platform. The population of users might include, for example, users of online email and search services such as those provided by Yahoo! Inc. (represented by computing device and associated data store 401).

Regardless of the nature of the search service provider, searches may be processed in accordance with an embodiment of the invention in some centralized manner. This is represented in FIG. 4 by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

The above described embodiments have several advantages. They compete with systems incorporating state-of-the-art machine learning techniques, such as support vector machines, but have much smaller resulting models and faster decoding time. They also therefore improve the accuracy of search results or advertisements provided to a user. Embodiments outperform prior state of the art systems by up to 22% in mean average precision.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
   extracting by a processor instances from a plurality of sources using a plurality of knowledge extractors;
   aggregating the instances from the plurality of sources;
   extracting a plurality of feature vectors for a plurality of instances using a plurality of feature generators, each feature vector extracted by a plurality of feature generators; and
   building a model by using a modeler based, at least in part, upon the feature vectors extracted by the plurality of feature generators and extracted instances,
   wherein building the model comprises automatically generating training sets of instances.

2. The computer-implemented method of claim 1, wherein building the model further comprises utilizing trusted positive instances in generating at least a portion of the training sets.

3. The computer-implemented method of claim 2, further comprising automatically generating the trusted positive instances with a trusted knowledge extractor of the plurality of knowledge extractors.

4. The computer-implemented method of claim 1, wherein building the decoder further comprises utilizing external positive instances in generating at least a portion of the training sets.

5. The computer-implemented method of claim 1, wherein building the decoder further comprises utilizing same class negative instances in generating at least a portion of the training sets.

6. The computer-implemented method of claim 1, wherein building the decoder further comprises utilizing near class negative instances in generating at least a portion of the training sets.

7. The computer-implemented method of claim 5, further comprising acquiring the same class negative instances by taking a random sample of instances extracted by a distributional knowledge extractor of the plurality of knowledge extractors.

8. The computer-implemented method of claim 5, further comprising acquiring the same class negative instances by taking a random sample of instances extracted by a pattern based knowledge extractor of the plurality of knowledge extractors.

9. The computer-implemented method of claim 1, wherein building the decoder further comprises utilizing generic negative instances in generating at least a portion of the training sets.

10. A computer system, comprising:
    a processor; and
    a memory, at least one of the processor or the memory being configured to:
    extract instances from a plurality of sources using a plurality of knowledge extractors;
    aggregate the instances;
    extract a plurality of feature vectors using a plurality of feature generators, wherein one of the feature generators extracts contexts of a query log for a plurality of seeds;
    calculates an association statistic between the contexts and seeds;
    sorts the contexts by the calculated association statistics and selects a group of the sorted contexts;

for each selected context, generates a feature for a candidate instance comprising the association statistic between the candidate instance and the context; and automatically generate labeled training sets based, at least in part, upon extracted feature vectors and one or more sources of negative instances.

11. The computer system of claim 10, wherein at least a portion of the training sets are automatically generated based, at least in part, upon trusted positive instances.

12. The computer system of claim 11, wherein the trusted positive instances are generated via a trusted knowledge extractor of the plurality of knowledge extractors.

13. The computer system of claim 10, wherein at least a portion of the training sets are automatically generated based, at least in part, upon external positive instances.

14. The computer system of claim 10, wherein at least a portion of the training sets are automatically generated based, at least in part, upon same class negative instances.

15. The computer system of claim 14, wherein the same class negative instances are acquired as a random sample of instances extracted by a distributional knowledge extractor of the plurality of knowledge extractors.

16. The computer system of claim 14, wherein the same class negative instances are acquired as a random sample of instances extracted by a pattern based knowledge extractor of the plurality of knowledge extractors.

17. The computer system of claim 10, wherein at least a portion of the training sets are automatically generated based, at least in part, upon generic negative instances.

18. A non-transitory computer-readable medium, comprising:

instructions for extracting instances from a plurality of sources using a plurality of knowledge extractors;

instructions for aggregating the instances from the plurality of sources;

instructions for extracting a plurality of feature vectors for a plurality of instances using a plurality of feature generators, each feature vector extracted by a plurality of feature generators; and instructions for building a model by using a modeler based, at least in part, upon the feature vectors extracted by the plurality of feature generators and extracted instances, wherein building the model comprises automatically generating training sets of instances.

19. The non-transitory computer-readable medium of claim 18, wherein building the model further comprises utilizing trusted positive instances in generating at least a portion of the training sets.

20. The non-transitory computer-readable medium of claim 19, further comprising:

instructions for generating the trusted positive instances using a trusted knowledge extractor of the plurality of knowledge extractors.

* * * * *